(12) United States Patent
Rugland et al.

(10) Patent No.: US 8,566,312 B2
(45) Date of Patent: Oct. 22, 2013

(54) METHOD, SYSTEM AND APPARATUS FOR ACCESSING STORED SPATIAL DATA

(75) Inventors: Terje Rugland, Tananger (NO); Trond Benum, Trondehim (NO)

(73) Assignee: Schlumberger Technology Corporation, Houston, TX (US)

( * ) Notice: Subject to any disclaimer, the term of this patent is extended or adjusted under 35 U.S.C. 154(b) by 1601 days.

(21) Appl. No.: 10/957,363

(22) Filed: Oct. 1, 2004

(65) Prior Publication Data
US 2005/0165725 A1 Jul. 28, 2005

Related U.S. Application Data

(60) Provisional application No. 60/507,575, filed on Oct. 1, 2003.

(51) Int. Cl.
G06F 7/00 (2006.01)
G06F 17/30 (2006.01)

(52) U.S. Cl.
USPC .......................................... 707/736; 707/918

(58) Field of Classification Search
USPC ......... 707/104.1, 10, 1, 2, 705, 736, 918, 919
See application file for complete search history.

(56) References Cited

U.S. PATENT DOCUMENTS

| 5,584,024 | A | 12/1996 | Shwartz |
| 5,845,278 | A * | 12/1998 | Kirsch et al. ...................... 707/3 |
| 5,937,409 | A | 8/1999 | Wetherbee |
| 6,184,823 | B1 * | 2/2001 | Smith et al. .............. 342/357.13 |
| 6,216,130 | B1 * | 4/2001 | Hougaard et al. .............. 707/10 |
| 6,272,457 | B1 * | 8/2001 | Ford et al. .......................... 704/9 |
| 6,708,183 | B1 * | 3/2004 | Mori et al. .................. 707/104.1 |
| 7,096,233 | B2 | 8/2006 | Mori et al. |
| 7,107,285 | B2 * | 9/2006 | von Kaenel et al. ....... 707/104.1 |
| 2002/0078008 | A1 | 6/2002 | Cambot et al. |
| 2002/0161788 | A1 * | 10/2002 | McDonald .................... 707/203 |
| 2005/0033716 | A1 * | 2/2005 | Ambroz et al. .................... 707/1 |

OTHER PUBLICATIONS

Parent, Christine et al., "Spatio-Temporal Conceptual Models: Data Structures + Space + Time," 1999, ACM GIS, pp. 26-33.*
International Search Report dated Jan. 21, 2005, 2 pages.
Office Action in related Canadian Patent Application No. 2,540,818, mailed Feb. 10, 2010, 9 pages.

* cited by examiner

*Primary Examiner* — Marc Somers
(74) *Attorney, Agent, or Firm* — Colin Weir; Rodney Warfford

(57) ABSTRACT

An apparatus, method and system for accessing database attributes stored in a first database are disclosed. The database attributes may be stored in a proprietary manner. The invention includes a data access layer having a second database, which maps visible attributes to the database attributes. The second database includes one or more artificial attributes, stored in meta data. The invention also includes an attribute pre-processing module for scanning a user request to see if the request includes the artificial attribute. The attribute pre-processing module creates an artificial attribute post processor, which can build a real attribute from a combination of the artificial attribute received from the attribute pre-processing module and a visible attribute received from the first database via the data access layer.

36 Claims, 5 Drawing Sheets

METHOD, SYSTEM AND APPARATUS FOR ACCESSING STORED SPATIAL DATA

CROSS REFERENCE TO RELATED APPLICATIONS

This is a utility application of provisional application Ser. No. 60/507,575 filed Oct. 1, 2003, and entitled "Method, System and Apparatus for Accessing Stored Spatial Data."

BACKGROUND OF THE INVENTION

1. Field of the Invention

This invention relates to methods and systems for use in database systems. In particular, the invention provides methods, apparatuses and systems for more effectively and efficiently accessing stored attributes and especially spatial data.

2. Prior Art

Different database schemas often store spatial data in a proprietary manner. This previously made it impossible to generically access spatial data stored in a proprietary manner, for example, in order to show the data on a map. One would have to write database-specific code for each database schema and data type in order to access the spatial data. This is time consuming and inconvenient. For oil and gas software applications, such data types might include well point locations, well deviation surveys, and seismic lines, to name a few. Other (non-spatial) data is also sometimes stored in a proprietary manner and is subject to the same problems.

SUMMARY OF THE INVENTION

In view of the above problems, an object of the present invention is to provide methods, apparatuses and systems for accessing data, including but not limited to spatial data, even if stored in a proprietary manner, in a database, while eliminating or minimizing the impact of the problems and limitations described. The present invention provides an improved way of accessing stored spatial data or other attributes, even if stored in a proprietary manner.

The present invention includes creating an artificial attribute dynamically during run-time of the software "on the fly," based on the meta-data description of how to create the shape object and the actual coordinate data ("spatial data") from the database. The preferred embodiment of the invention includes an apparatus for accessing database attributes stored in a first database that includes a data access layer having a second database. The data access layer maps visible attributes to the database attributes. The second database includes one or more artificial attributes, stored in meta data. This preferred embodiment of the invention also includes an attribute pre-processing module. The attribute pre-processing module scans a user request to see if the request includes the artificial attribute. The attribute pre-processing module creates an artificial attribute post processor, which can build a real attribute from a combination of the artificial attribute received from the attribute pre-processing module and a visible attribute received from the first database via the data access layer. The artificial attribute may be spatial data, but is not so limited. The artificial attribute could be other types of data, such as a formula, or it could be used to derive a symbol code from other attributes. After it builds the real attribute, the artificial attribute post processor sends the real attribute to an output. This could be any type of output and might, for example, include a display screen and/or a printer. If there is a plurality of artificial attributes, which is typical, they are stored within the second database by topic. Each artificial attribute preferably includes a usage rule that identifies the artificial attribute as artificial and describes a location where data is stored to build the artificial attribute into a real attribute. Each artificial attribute may also include a building block that describes the artificial attribute.

Another preferred embodiment of the invention includes a method for accessing data stored in a first database. The data may be stored in a proprietary manner. The method includes receiving a request for stored data, scanning the request to see if the request seeks an artificial attribute stored in meta data on a second database, retrieving data required to build a requested artificial attribute into a real attribute and using the retrieved data to build the real attribute. The real attribute can be sent to an output, which might include a display or a printer. The artificial attribute includes a usage rule and at least one building block, specifying the location of the data to be retrieved to build the real attribute. The retrieved data preferably includes the artificial attribute. If there are a plurality of artificial attributes stored in meta data in the second database, the plurality of artificial attributes are preferably organized by topic. The artificial attribute is spatial data, but is not so limited. For example, the artificial attribute may be a formula or may be used to derive a symbol code from other attributes.

Another preferred embodiment of the invention is a system for accessing database attributes stored in a first database, even if stored in a proprietary manner. The system includes a data access layer with a second database. The data access layer maps visible attributes to the database attributes. The second database has one or more artificial attributes, stored in meta data. The system also includes an attribute pre-processing module for scanning a user request to see if the request includes the artificial attribute, as well as an artificial attribute post processor created by the attribute pre-processor to be suitable for building a real attribute. The artificial attribute post processor builds the real attribute from the artificial attribute received from the attribute pre-processing module and from a visible attribute received from the first database via the data access layer. The artificial attribute post processor sends the real attribute to an output, which may include, for example, a display screen and/or a printer. The artificial attribute may be a shape, but is not so limited. For example, it may be some other type of data such as a formula or may be used to derive a symbol code from other attributes. The artificial attribute may include a usage rule that identifies the artificial attribute as artificial and describes where data is stored to build the artificial attribute into a real attribute and may include one or more building blocks that describe the artificial attribute. If the system has a plurality of artificial attributes stored in meta data in the second database, they are preferably stored by topic.

Other objects, features and advantages of the present invention will become apparent to those of skill in art by reference to the figures, the description that follows and the claims.

DETAILED DESCRIPTION OF THE DRAWINGS

In the following detailed description of the preferred embodiments and other embodiments of the invention, reference is made to the accompanying drawings. It is to be understood that those of ordinary skill in the art will readily see other embodiments and changes may be made without departing from the scope of the invention.

An advantage of the present invention is that in order to access, for example, spatial data stored in a proprietary manner in a database, the spatial data having a shape, one describes in meta-data, that is, dynamically, where different components of the spatial data should come from. The invention provides for enabling code that reads the meta-data from the database. In this way, the description in meta-data can be modified by people configuring the software. For example, a user might describe in meta-data that the x coordinates of the shape should come from a database attribute called "location_x" and that the y coordinates should come from an attribute called "location_y". In some cases, such as image generation, there might easily be twenty such components. The invention is not limited being applied to spatial data but can be applied to other types of data in a similar manner. The invention can be better understood by reference to the drawings.

Figure 1:
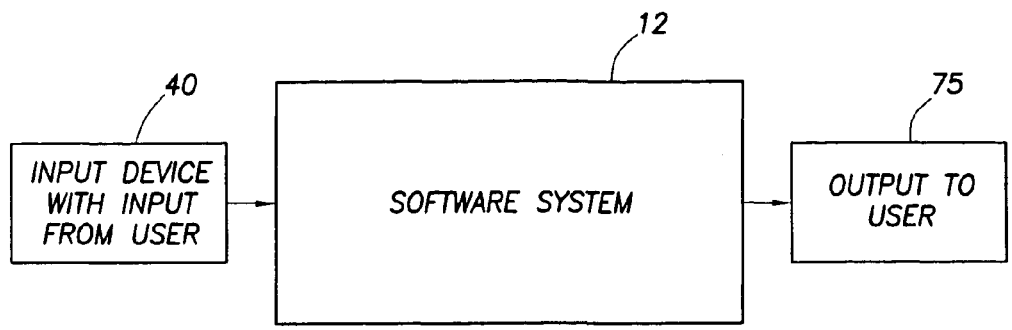
FIG. 1 is a block diagram of an overview of a system and illustrates a preferred embodiment of the present invention.

FIG. 1 is a block diagram of an overview of a system containing a preferred embodiment of the present invention. The system includes an input device 40 for input from a user, a software system 12 and an output 75. These elements are discussed in more detail below in the discussion concerning FIG. 2.

Figure 2:
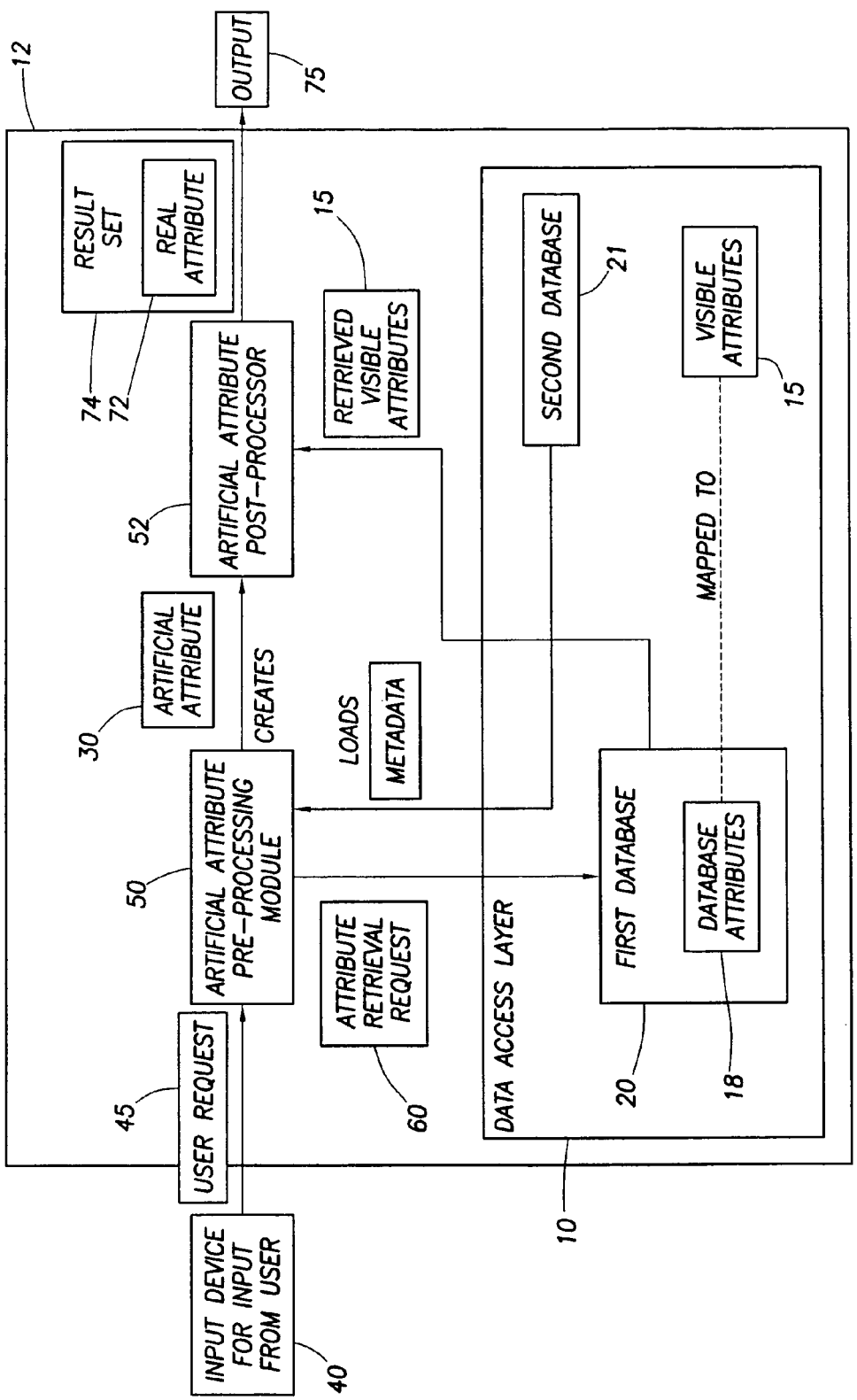
FIG. 2 is a block diagram illustrating a preferred embodiment of the present invention.

FIG. 2 provides a more detailed block diagram of a preferred embodiment of the present invention. Within the software system 12, a database-specific data access layer 10 defines database attributes 18 of an entity (not depicted). An entity is an object to be created by the software system 12 (and may represent an object in the physical world). In oil and gas software applications, for example, a well may be an entity. Database attributes 18 refer to aspects of the entity and are defined on a first database 20. Database attributes 18 are typically stored in a table and are accessed from tables or database views. For example, if the entity is a well, database attributes 18 in the first database may include its name, status, and location. Another type of attribute is a visible attribute 15 (depicted in FIGS. 2 and 3). Visible attributes 15 are attributes that the user can physically perceive on a display. If an attribute is a well name and the user toggles on the attribute before executing a query, she will see the actual well name when the data is retrieved. Visible attributes 15 are stored in the data access layer 10.

The database-specific data access layer 10 maps the visible attributes 15 to underlying database attributes 18 that are stored within the first database 20, which may be proprietary. Such database-specific data access layers 10 and associated first databases 20 are commercially available and are in use, for instance within oil and gas exploration companies. Examples of such database-specific data access layers 10 and first databases 20 include GEOQUEST™, GEOFRAME®, Landmark's OPENWORKS® and the PROSOURCE® FEDERATOR™. Visible attributes 15 are often stored in such a way in order to hide the actual database implementation from an application that uses it, so the underlying first database 20 may be modified without having to modify every application that uses the first database 20. The data access layer 10 also includes a second database 21. GEOQUEST™ is a trademark of Schlumberger located in Houston, Tex. GEOFRAME® is a registered trademark of Schlumberger located in Houston, Tex. OPENWORKS® is a registered trademark of Halliburton Energy Services located in Houston, Tex. PROSOURCE® is a registered trademark of Schlumberger located in Houston, Tex. FEDERATOR™ is a trademark of Schlumberger located in Houston, Tex.

Figure 3:
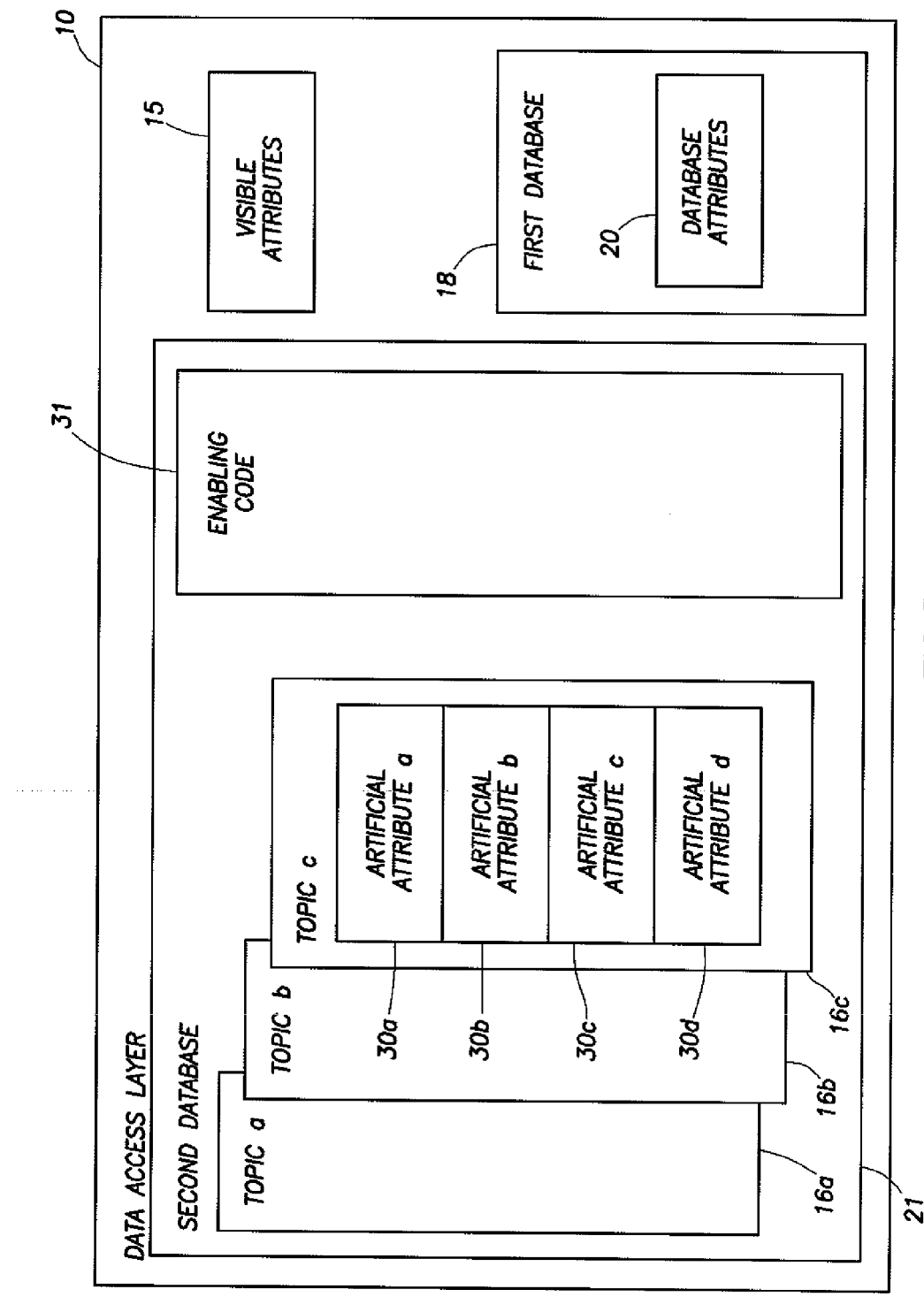
FIG. 3 is a flowchart of a preferred embodiment of the present invention.

In a preferred embodiment of the present invention, as illustrated in FIG. 3, an artificial attribute 30 is stored or "registered" in meta-data in the second database 21 in the database-specific data access layer 10. Referring to FIG. 3, the database-specific data access layer 10 and the second database 21 are organized by topics 16. For oil and gas applications, topics 16 may include, but are not limited to, wells 16a, logs 16b, seismic data 16c, etc. A topic 16 is an entity that, like the visible attribute 15, may be made visible to a user, such as in a query interface. As depicted in FIG. 3, there may be more than one artificial attribute 30a, 30b, 30c, 30d per topic 16 in the second database 21 of database-specific data access layer 10. The visible attributes 15 are also preferably stored by topic (although that detail is not depicted in FIG. 3).

Referring again to FIG. 3, enabling code 31 that reads meta-data is also stored in the second database 21. The enabling code 31 supports read/insert/update/delete operations from the topics 16 which are defined in meta data and stored in the second database 21.

The artificial attribute 30 is descriptive of its respective topic 16 in the way that attributes in general are descriptive of their entities. Taking a preferred embodiment of the invention where the artificial attribute 30 has a shape, the artificial attribute 30 is artificial in the sense that there is no direct underlying shape among the database attributes 18 stored in the database 20 that corresponds to the artificial attribute 30.

Since the artificial attribute 30 is "visible" at the topic level, the artificial attribute 30 appears like any other "normal visible" attribute 15 to the user, even though the artificial attribute 30 (unlike visible attribute 15) does not exist directly in the database 20. The user may select the artificial attribute 30 like any other attribute (i.e. well_name which is stored directly in the database 20).

Figure 4:
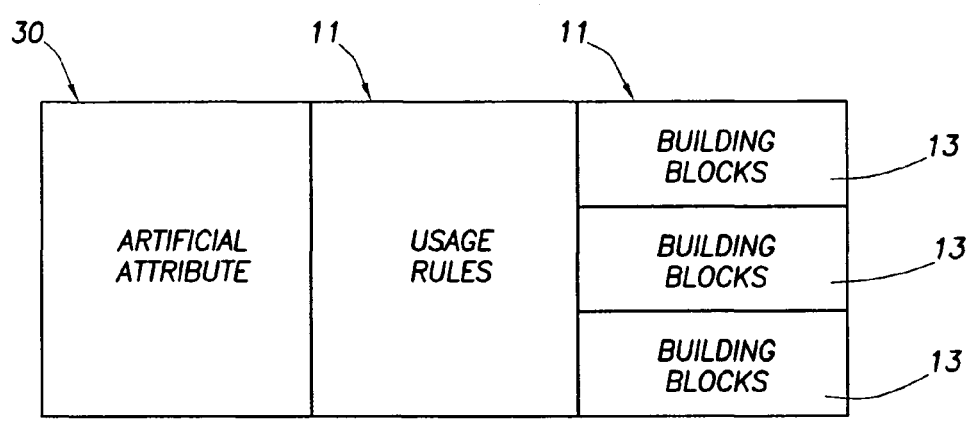
FIG. 4 is a representation of an artificial attribute of a preferred embodiment of the present invention.

Referring to FIG. 4, which shows a representation of an artificial attribute 30, artificial attributes 30 are each flagged with a special text string, called a usage rule 11, that states that the attribute is an artificial attribute 30 (as opposed to a real attribute which also has some direct underlying database attribute in the database 20) and describes where the "real data" to create the artificial attribute 30 should come from. The usage rule 11 thus describes how to create the artificial attribute 30 from the real data.

Together with the artificial attribute 30 and usage rule 11, building blocks 13 for the artificial attribute 30 are also stored in the meta-data in the usage rule 11. In the preferred embodiment where an artificial attribute 30 has a shape, the building blocks 13 are used to define the shape of the artificial attribute 30, for example, a point, a rectangle, a polyline, a polygon, an image etc.

For example, if an artificial attribute 30 is a point, the building blocks 13 that the artificial attribute required would be determined geometrically, and in this case may include a "x attribute", a "y attribute" and a "coordinate system attribute." If the artificial attribute is of a more complex shape type, such as a grid image, the artificial attribute 30 would likely need more building blocks 13.

Referring again to FIG. 2, the user through an input device 40, such as for example a keyboard or mouse, sends a request 45 for data to an attribute pre-processing module 50. The user may want the data so that it can be displayed on a map for example, or so that it can be used in some other way. When the user requests data, the user does so by referencing an attribute that can be physically perceived by the user, such as visibly on a display screen (not depicted). The requested attribute could be a visible attribute 15 or artificial attribute 30.

The attribute pre-processing module 50 reviews the request 45 to determine whether an artificial attribute 30 is requested. To do this, the attribute pre-processing module 50 scans all attributes in the request 45 to see whether any of the requested attributes are an artificial attribute 30. Meta data from the second database 21 in the database-specific data access layer 10 is loaded into the attribute pre-processing module 50.

If an artificial attribute 30 is requested, the attribute pre-processing module 50 instantiates, or creates, an artificial attribute post-processor 52 of the proper type, based on the artificial attribute meta data. For example, if the artificial attribute 30 is a point artificial attribute, the attribute pre-processing module 50 will instantiate a point artificial attribute post-processor 52, which knows how to create a point shape. Similarly, the attribute pre-processing module 50 will instantiate a polygon artificial attribute post-processor 52, which knows how to create polygons, if the artificial attribute 30 is a polygonal artificial attribute, or the attribute pre-processing module 50 will instantiate a formula attribute post-processor 52 if the artificial attribute 30 is a formula. Note that artificial attributes 30 are not only limited to shapes. The artificial attributes 30 can also be used for other types of data, such as formulas. For example: A true vertical depth (TVD) artificial attribute post-processor 52 can be used to compute the true vertical depth along a wellbore, given the building blocks 13 of a wellbore deviation survey (an array with x,y coordinates) and a measured depth (z) along the wellbore deviation survey.

When it creates the artificial attribute post processor 52, the artificial attribute pre-processing module 50 feeds the artificial attribute 30, along with its usage rule 11 and its building blocks 13 into the artificial attribute post-processor 52. The attribute pre-processing module 50 sends a database request 60 to the database-specific data access layer 10 to retrieve from the database 20 the visible attributes 15 required for creating a real attribute 72 corresponding to the artificial attribute 30, using the artificial attribute's usage rule 11 and building blocks 13. The database-specific data access layer 10 retrieves the visible attributes 15 from the database 20 and then sends the retrieved visible attributes 15 to the artificial attribute post-processor 52. The artificial attribute post-processor 52 then creates the real attribute 72 corresponding to the artificial attribute 30 which the user wants to retrieve. The artificial attribute post-processor 52 replaces the artificial attribute 30 with the corresponding real attribute 72 in a return result set 74 (the complete set of data returned from the database), which is sent to the output 75. The return result set 74 sent to an output 75 may be displayed on a map or screen or printed out or may be used as input to another software module, such as a data transfer module.

Figure 5:
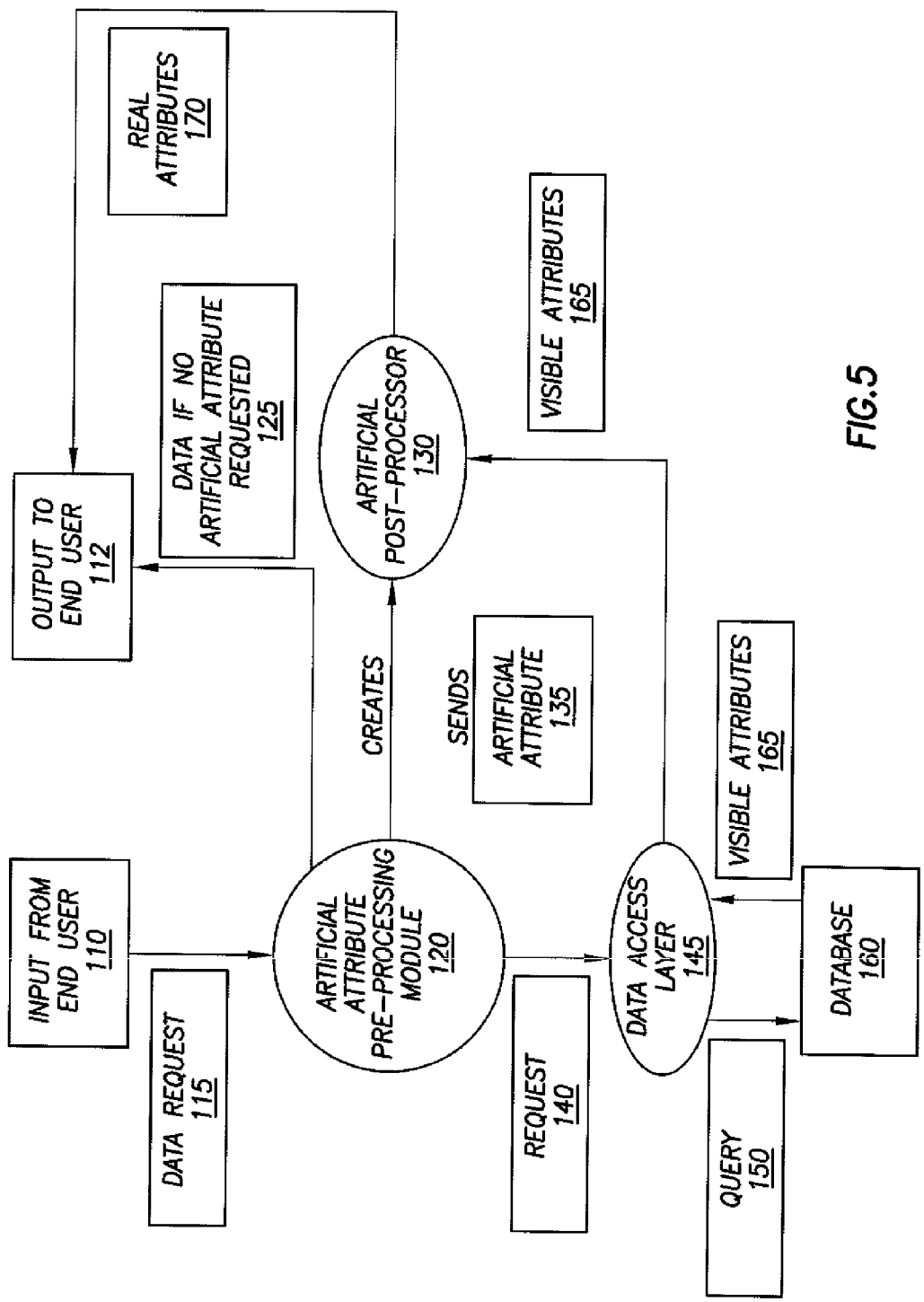
FIG. 5 is a flow schematic for a preferred embodiment of the present invention.

FIG. 5 depicts a flow schematic of a preferred embodiment of the present invention. The input from the end user 110 sends a data request 115 to the attribute pre-processing module 120. The attribute pre-processing module 120 scans the data request 115 and if no artificial attributes are requested 125, does nothing further before the output is presented to the end user 112. If artificial attributes are requested, the attribute pre-processing module 120 creates an artificial attribute post-processor 130 and sends the artificial attribute 135 to the artificial attribute post-processor 130. The attribute pre-processing module 120 also sends a request 140 for visible attributes to the data access layer 145, which sends a query 150 to the database 160 and retrieves the visible attributes 165. The data access layer 145 sends the visible attributes 165 to the artificial attribute post-processor 130. The artificial attribute post-processor 130 uses the visible attributes 165 and the artificial attribute 135 to create corresponding real attributes 170, which are sent to the end user 112.

The attribute pre-processor works independently of the data access layer, and works based on meta-data. This way data access to spatial data and other types of data and attributes may be provided for a database, without having to write any specific processing code for this database. This saves code and maintenance time, and it also enables supporting custom databases simply by defining where in the database the components of the data come from.

In another aspect of the present invention, an artificial attribute may be used to derive a symbol code from other attributes. For example, the "well plot symbol" may be derived from the "well status code" attribute and the "well type" attribute. A well plot symbol processor could use the well status code and well type to look up the proper well plot symbol to use from a list of valid well plot symbols.

Figure 6:
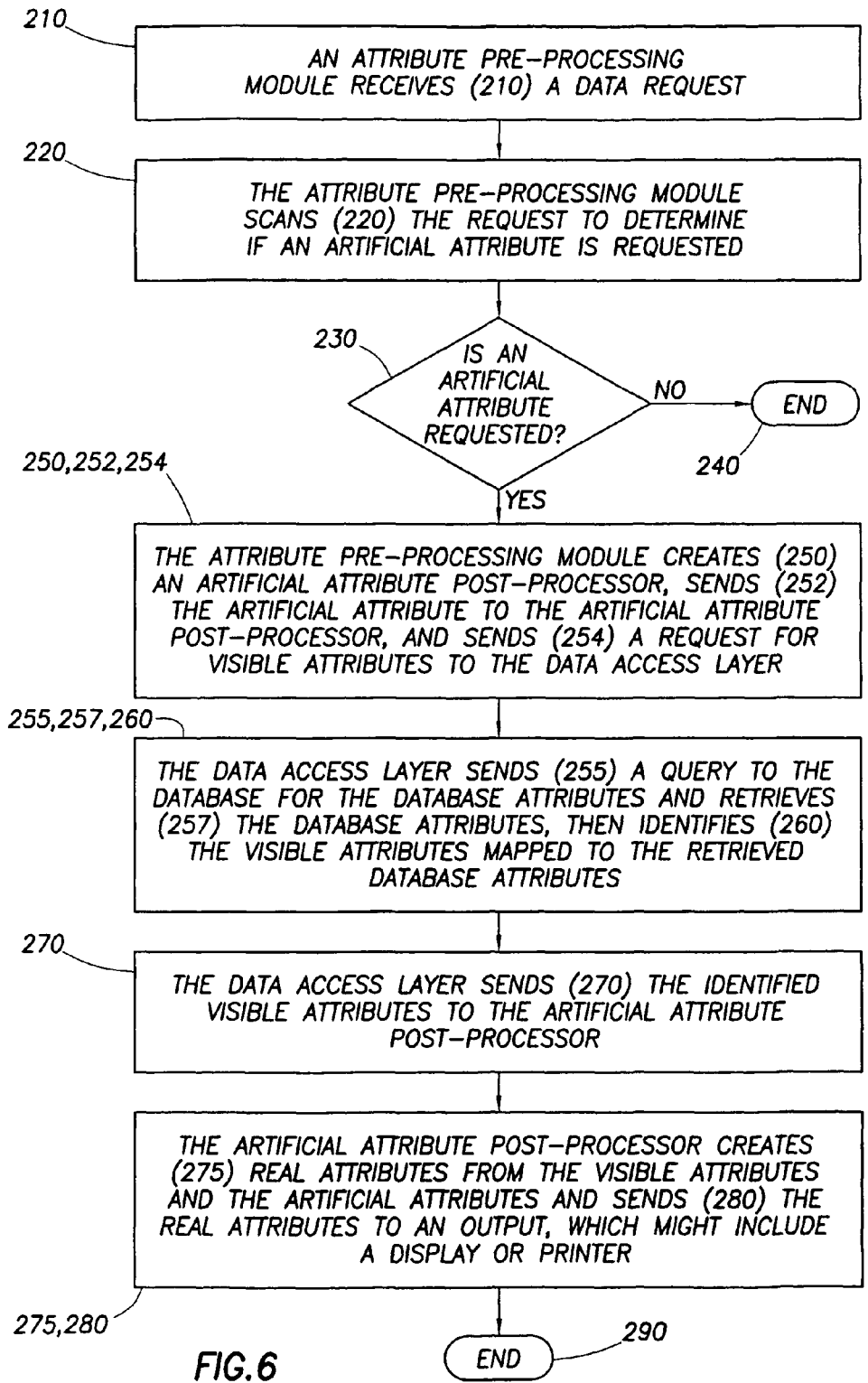
FIG. 6 is a flowchart for a preferred embodiment of the present invention.

FIG. 6 depicts a flow chart of a preferred embodiment of the present invention. An attribute pre-processing module receives 210 a data request. The attribute pre-processing module scans 220 the request to determine if an artificial attribute is requested. If the answer to the question 230 of whether an artificial attribute was requested is no, the attribute pre-processing module does nothing further 240. If an artificial attribute was requested, then the attribute pre-processing module creates 250 an artificial attribute post-processor, sends 252 the artificial attribute to the artificial attribute post-processor, and sends 254 a request for visible attributes to the data access layer. The data access layer sends 255 a query to the database for the database attributes and retrieves 257 the database attributes. The data access layer identifies 260 the visible attributes mapped to the database attributes and sends 270 the visible attributes to the artificial attribute post-processor. The artificial attribute post-processor creates 275 real attributes from the visible attributes and the artificial attributes and sends 280 the real attributes to an output, which might include a display or printer. The process ends 290.

Although the foregoing is provided for purposes of illustrating, explaining and describing certain embodiments of the automated repetitive array microstructure defect inspection invention in particular detail, modifications and adaptations to the described methods, systems and other embodiments will be apparent to those of ordinary skill in the art and may be made without departing from the scope or spirit of the invention.

What is claimed is:

1. An apparatus for accessing database attributes stored in a first database, comprising:
  a memory configured to store a first data access layer having a second database and a second data access layer having a third database,
    the first data access layer for:
      mapping a first visible attribute to first non-spatial data components of a first proprietary spatial attribute of the first database, wherein the first visible attribute is stored in the first data access layer by topic, and providing access to retrieve the non-spatial data components while hiding a first database implementation of the first proprietary spatial attribute, the second data access layer for:
mapping a second visible attribute to second non-spatial data components of a second proprietary spatial attribute of a fourth database, wherein the second visible attribute is stored in the second data access layer by topic, and providing access to retrieve the second non-spatial data components while hiding a second database implementation of the second proprietary spatial attribute, and the second database and the third database comprising meta data, wherein the meta data comprises a first artificial attribute used to create a first artificial attribute post processor and a second artificial attribute used to create a second artificial attribute post processor, wherein the first artificial attribute describes a formula for a first real attribute and first visible attribute for dynamically calculating the first real attribute, and wherein the second artificial attribute describes a spatial data type of a second real attribute and second visible attribute for dynamically building the second real attribute, and a processor configured to:
execute an attribute pre-processing module for:
scanning a user request to verify whether the request includes the first artificial attribute and the second artificial attribute, and obtaining, according to a usage rule for the first artificial attribute, the formula and the first non-spatial data components, create the first artificial attribute post processor suitable for dynamically calculating, according to the formula, the first real attribute from a first combination of the first artificial attribute received from the first attribute pre-processing module and the first non-spatial data components received from the first data access layer, and create the second artificial attribute post processor suitable for dynamically building the second real attribute from a second combination of the second artificial attribute received from the second attribute pre-processing module and the second non-spatial data components received from the second data access layer, wherein the second database and the third database comprise a plurality of artificial attributes stored in meta data, wherein the plurality of artificial attributes are stored by topic for selecting the first artificial attribute and the second artificial attribute from the plurality of artificial attributes.

2. An apparatus as in claim 1, wherein the first artificial attribute is spatial data.

3. An apparatus as in claim 1, wherein the first artificial attribute is a shape.

4. An apparatus as in claim 1, wherein the first artificial attribute is used to derive a symbol code from other attributes.

5. An apparatus as in claim 1, wherein the first artificial attribute post processor sends the first real attribute to an output.

6. An apparatus as in claim 5, wherein the output includes a display screen.

7. An apparatus as in claim 5, wherein the output includes a printer.

8. An apparatus as in claim 1, wherein the first visible attribute consists of non-spatial data.

9. An apparatus as in claim 1, wherein the first artificial attribute includes the usage rule that identifies the first artificial attribute as artificial and describes a location where data is stored to dynamically calculate the first artificial attribute into the first real attribute.

10. An apparatus as in claim 1, wherein the first artificial attribute includes a building block that describes the first artificial attribute.

11. An apparatus as in claim 1, further comprising enabling code stored in the second database, the enabling code capable of reading the meta data also stored in the second database and the enabling code supporting read/insert/update/delete operations.

12. An apparatus as in claim 1, wherein each artificial attribute includes a corresponding usage rule, which identifies the artificial attribute as artificial and describes a location where data is stored to dynamically build the artificial attribute into the corresponding real attribute, and at least one building block, and wherein the corresponding artificial attribute post processor sends the corresponding real attribute to an output.

13. A method for accessing data stored in a first database comprising:
receiving a request for stored data;
scanning, using a computer processor, the request to verify whether the request seeks a first artificial attribute and a second artificial attribute, wherein a second database and a third database comprise meta data, wherein the meta data comprises the first artificial attribute and the second artificial attribute;

retrieving, using the computer processor and according to a usage rule, data required to dynamically calculate the first artificial attribute into a first real attribute and to dynamically build the second artificial attribute into a second real attribute; and using the retrieved data to dynamically calculate, according to a formula and using the computer processor, the first real attribute, wherein the retrieved data comprises the first artificial attribute used to create a first artificial attribute post processor and first non-spatial data components, wherein the first artificial attribute describes the formula for the first real attribute and a first visible attribute for dynamically calculating the first real attribute, wherein the first visible attribute is stored in a first data access layer by topic and mapped to the first non-spatial data components of a first proprietary spatial attribute of the first database, and wherein the first data access layer provides access to retrieve the first non-spatial data components while hiding a first database implementation of the first proprietary spatial attribute, using the retrieved data to dynamically build, using the computer processor, the second real attribute, wherein the retrieved data comprises the second artificial attribute used to create a second artificial attribute post processor and second non-spatial data components, wherein the second artificial attribute describes a spatial data type of the second real attribute and a second visible attribute for dynamically building the second real attribute, wherein the second visible attribute is stored in a second data access layer by topic and mapped to the second non-spatial data components of a second proprietary spatial attribute of a fourth database, and wherein the second data access layer provides access to retrieve the second non-spatial data components while hiding a second database implementation of the second proprietary spatial attribute, wherein the second database and the third database comprise a plurality of artificial attributes stored in meta data, wherein the plurality of artificial attributes are stored by topic for selecting the first artificial attribute and the second artificial attribute from the plurality of artificial attributes.

14. A method as in claim 13, wherein the first artificial attribute includes a usage rule and at least one building block that specifies the location of the data to be retrieved to dynamically build the first real attribute.

15. A method as in claim 13, further comprising sending the first real attribute to an output.

16. A method as in claim 15, wherein the output includes a display.

17. A method as in claim 15, wherein the output includes a printer.

18. A method as in claim 13, wherein the first visible attribute consists of non-spatial data.

19. A method as in claim 18, further comprising enabling code, stored in the second database, reading the meta data stored in the second database and supporting read/insert/update/delete operations.

20. A method as in claim 13, wherein the first artificial attribute is spatial data.

21. A method as in claim 13, wherein the first artificial attribute is a shape.

22. A method as in claim 13, wherein the first artificial attribute is used to derive a symbol code from other attributes.

23. A method as in claim 13, wherein the plurality of artificial attributes are organized by topic, each artificial attribute including a usage rule and at least one building block, specifying the location of the data to be retrieved to dynamically build the corresponding real attribute and further comprising:

enabling code, stored in the second database, reading the meta data stored in the second database and supporting read/insert/update/delete operations, and sending the corresponding real attribute to an output.

24. A method for accessing data stored in a first database comprising:

an attribute pre-processor receiving a request for stored data;

the attribute pre-processor scanning the request to verify whether the request seeks a first artificial attribute and a second artificial attribute, wherein a second database and a third database comprise meta data, wherein the meta data comprises the first artificial attribute used to create a first artificial attribute post processor and the second artificial attributed used to create a second artificial attribute post processor, wherein the first artificial attribute describes a formula for a first real attribute and a first visible attribute for dynamically calculating a first real attribute, wherein the second artificial attribute describes a spatial data type of a second real attribute and a second visible attribute for dynamically building a second real attribute, wherein the first visible attribute and second visible attribute are stored in a first data access layer and a second data access layer by topic and each mapped to non-spatial data components of a proprietary spatial attribute, wherein each of the first visible attribute and second visible attribute provides access to retrieve the non-spatial data components while hiding a database implementation of the proprietary spatial attribute;

if the request seeks the first artificial attribute and the second artificial attribute, the attribute pre-processor creates the first artificial attribute post processor and the second artificial attribute post processor, sends, according to a usage rule, the first artificial attribute to the first artificial attribute post-processor, sends the second artificial attribute to the second artificial attribute post-processor, sends a request for the visible attributes to the first data access layer and the second data access layer;

the first data access layer sending a first query to the first database for first non-spatial data components of a first proprietary spatial attribute of the first database, retrieving the first non-spatial data components, and sending the retrieved first non-spatial data components to the first artificial attribute post-processor;

the first artificial attribute post-processor calculating, according to the formula, a first real attribute from the first non-spatial data components and the first artificial attribute and sending the first real attribute to an output, the second data access layer sending a second query to a fourth database for second non-spatial data components of a second proprietary spatial attribute of the fourth database, retrieving the second non-spatial data components, and sending the retrieved second non-spatial data components to the second artificial attribute post-processor; and the second artificial attribute post-processor creating a second real attribute from the second non-spatial data components and the second artificial attribute and sending the second real attribute to the output, wherein the second database and the third database comprise a plurality of artificial attributes stored in the meta data, wherein the plurality of artificial attributes are stored by topic for selecting the first artificial attribute and the second artificial attribute from the plurality of artificial attributes.

25. A system for accessing database attributes stored in a first database, comprising:

a memory configured to store a first data access layer having a second database and a second data access layer having a third database, the first data access layer for:
mapping a first visible attribute to first non-spatial data components of a first proprietary spatial attribute of the first database, wherein the first visible attribute is stored in the first data access layer by topic, and providing access to retrieve the non-spatial data components while hiding a first database implementation of the first proprietary spatial attribute, the second data access layer for:
mapping a second visible attribute to second non-spatial data components of a second proprietary spatial attribute of a fourth database, wherein the second visible attribute is stored in the second data access layer by topic, and providing access to retrieve the second non-spatial data components while hiding a second database implementation of the second proprietary spatial attribute, the second database and the third database comprising meta data, wherein the meta data comprises a first artificial attribute used to create a first artificial attribute post processor and a second artificial attribute used to create a second artificial attribute post processor, wherein the first artificial attribute describes a formula for a first real attribute and first visible attribute for dynamically calculating the first real attribute, and wherein the second artificial attribute describes a spatial data type of a second real attribute and second visible attribute for dynamically building the second real attribute, and a processor configured to execute:
  an attribute pre-processing module for:
    scanning a user request to verify whether the request includes the first artificial attribute and the second artificial attribute, and
    obtaining, according to a usage rule for the first artificial attribute, the formula and the first non-spatial data components;
  the first artificial attribute post processor, created by the attribute pre-processing module, for dynamically calculating, according to the formula, the first real attribute from:
    the first artificial attribute received from the attribute pre-processing module, and
    the first non-spatial data components received from the first data access layer; and
  the second artificial attribute post processor, created by the attribute pre-processing module, for dynamically building the second real attribute from:
    the second artificial attribute received from the attribute pre-processing module, and
    the second non-spatial data components received from the second data access layer,
wherein the second database and the third database comprise a plurality of artificial attributes stored in the meta data, wherein the plurality of artificial attributes are stored by topic for selecting the first artificial attribute and the second artificial attribute from the plurality of artificial attributes.

26. A system as in claim 25, wherein the first artificial attribute is spatial data.

27. A system as in claim 25, wherein the first artificial attribute is a shape.

28. A system as in claim 25, wherein the first artificial attribute is used to derive a symbol code from other attributes.

29. A system as in claim 25, wherein the first artificial attribute post processor sends the first real attribute to an output.

30. A system as in claim 29, wherein the output includes a display screen.

31. A system as in claim 29, wherein the output includes a printer.

32. A system as in claim 25, wherein the first artificial attribute further comprises enabling code stored in the second database, the enabling code capable of reading the metadata and the enabling code supporting read/insert/update/delete operations.

33. A system as in claim 25, wherein the first visible attribute consists of non-spatial data.

34. A system as in claim 25, wherein the first artificial attribute includes the usage rule that identifies the first artificial attribute as artificial and describes where data is stored to dynamically calculate the first artificial attribute into the first real attribute.

35. A system as in claim 25, wherein the first artificial attribute includes a building block that describes the first artificial attribute.

36. A system as in claim 25, further comprising:
  each artificial attribute having a corresponding usage rule and a building block that describes the artificial attribute;
  enabling code stored in the second database, the enabling code capable of reading the meta data and the enabling code supporting read/insert/update/delete operations; and
  the corresponding artificial attribute post processor capable of sending the corresponding real attribute to an output.

* * * * *